United States Patent [19]

Hayashi et al.

[11] Patent Number: 5,044,456
[45] Date of Patent: Sep. 3, 1991

[54] HYDRAULICALLY OPERATED POWER STEERING SYSTEM

[75] Inventors: Yasuhito Hayashi, Toyota; Hiroshi Hachisuka, Nishio, both of Japan

[73] Assignee: Aisin Seiki Kabushiki Kaisha, Kariya, Japan

[21] Appl. No.: 472,872

[22] Filed: Jan. 31, 1990

[30] Foreign Application Priority Data

Jan. 31, 1989 [JP] Japan .................................. 1-11229

[51] Int. Cl.$^5$ ............................................. B62D 5/087
[52] U.S. Cl. .................................... 180/132; 180/146; 74/388 PS
[58] Field of Search ............... 180/132, 141, 146, 147; 74/388 PS; 60/384; 91/378, 380

[56] References Cited

U.S. PATENT DOCUMENTS 4,421,011 12/1983 Elser ...................................... 91/380

Primary Examiner—Charles A. Marmor
Assistant Examiner—Victor E. Johnson
Attorney, Agent, or Firm—Burns, Doane, Swecker & Mathis

[57] ABSTRACT

A power steering system is provided in which the rack portion of the power piston is strengthened while still shortening the axial length of the power piston associated therewith. This is accomplished by providing a control valve which includes a valve lever received in a power piston of the device which is relatively rotatable with respect to the power piston and moves in an axial direction of the housing with the power piston in response to rotation from an input shaft connected with the steering wheel. The valve lever has an engaging portion which projects outside of the power piston so as to be connected therewith when the valve reciprocates. The reciprocation of the valve will assist in the operation of the power steering unit and provide the power assist. The valve lever has a portion engageable with a pin member received in the valve spool of the control valve so as to reciprocate the control valve. This arrangement permits the rack portion of the power steering unit to be provided with increased strength even though the axial length of the power piston is decreased and the rack and valve operating lever are positioned on the same side of the power steering unit and still permits the size of the system to be decreased.

4 Claims, 2 Drawing Sheets

HYDRAULICALLY OPERATED POWER STEERING SYSTEM

BACKGROUND OF THE INVENTION

1. Field of the Invention

The present invention relates to a hydraulically operated power steering system for use in an automotive vehicle and particularly to a hydraulically operated power steering system having a valve spool which changeovers the fluid communication between each fluid chamber of a reciprocal hydraulic operating cylinder device and a fluid pump or a reservoir in response to the rotation of an input shaft and which is disposed at the outside of a power piston of the reciprocal hydraulic operating cylinder device.

2. Description of the Related Art

It is known that there are two types of a hydraulically operated power steering systems. One type of hydraulically operated power steering system includes a valve spool which changeovers the fluid communication between each hydraulic pressure chamber of a reciprocal hydraulic operating cylinder device and a fluid pump or a reservoir in response to the rotation of an input shaft. The valve spool is disposed at the outside of a power piston of the reciprocal hydraulic operating cylinder device which is slidably fitted in a housing, and a valve lever is disposed in the power piston so as to be relatively rotatable with respect to the power piston and to move with the power piston in response to the rotation of the input shaft and engages with the valve spool. This type of power steering system has the advantages of another type in which the valve spool is disposed in the power piston so as to reduce the weight of the power piston and simplify the structure of the hydraulically operated power steering system. For example, U.S. Pat. Nos. 3,885,456 and 3,990,350 disclose this type of system.

In this type of system, since the valve lever is arranged for unitary movement with the power piston, if an engaging portion of the valve lever is constructed so as to not project outside of the power piston and a bore, fitted with the valve spool, is overlapped to an inner bore of the housing fitted the power piston, the axial length of the power piston is increased in order to ensure the length of the guide surface of the power piston.

As a result, since the axial length of the hydraulically operated power steering system is increased, it is necessary to project the engaging portion of the valve lever to the outside of the power piston and to separate the bore fitted with the valve spool from the inner bore fitted with the power piston in order to prevent an increase in the length of the system. Further, since the power piston is provided with a rack portion which transmits the movement of the input shaft to the output shaft and which is not a guide surface of the power piston, it is necessary to position the valve lever in the same position in the axial direction with respect to the position of the rack portion. Furthermore, in this case, it must be considered that the power piston is disposed in the inner bore of the housing after the valve lever is received in the power piston in order to provide for ease of installation.

Therefore, due to these restrictions, in the above prior system, the inner bore of the housing and the power piston are formed in a stepped-shape. That is, the inner bore has a large-diameter portion at its opening side so as to not be detrimental or otherwise hinder the ease of installation, and the rack portion and the valve lever are positioned in a small-diameter portion of the power piston. Further, the engaging portion of the valve lever is received in an outer diameter, i.e., the large-diameter portion of the power piston. According to this structure, the axial length of the system is reduced. However, since the rack portion is formed on the small-diameter portion of the power piston, the strength of the rack portion cannot be ensured due to shortening or decreasing the axial length of the power piston by simply positioning the valve lever and the rack portion at the same position in the axial direction when the magnitude of the power assist of the steering system is increased for use in large-size vehicles.

SUMMARY OF THE INVENTION

It is therefore, an object of the present invention to ensure that the rack portion of the power piston is of adequate strength while shortening the axial length of the power piston.

It is another object of the present invention to miniaturize the hydraulically operated power steering system without deterioration of the performance of the system or its ease of assembly and installation.

In order to achieve these objects, there is provided an improved hydraulically operated power steering system which comprises a reciprocal hydraulic operating cylinder device for moving a steering link mechanism. First and second fluid chambers are defined in an inner bore formed in a housing by a power piston slidably received in a fluid tight manner in the inner bore. A reservoir is provided with hydraulic fluid therein and a fluid pump feeds the hydraulic fluid in the reservoir to the cylinder device. A control valve device including a valve lever is received in the power piston so as to be relatively rotatable with respect to the power piston and to move in the axial direction of the housing with the power piston in response to rotation of an input shaft. The valve lever has an engaging portion projecting outside of the power piston and has an engaging surface extending in the sliding direction of the power piston. A valve spool is slidably disposed in a bore which is separately and perpendicularly formed with respect to the inner bore and slidably engaged with the engaging portion of the valve lever so as to reciprocate in response to the rotation of the input shaft. The hydraulic fluid from the fluid pump is introduced into the first fluid chamber upon rotation of the input shaft in one direction while the hydraulic fluid in the second fluid chamber is discharged to the reservoir.

The hydraulic fluid from the fluid pump is introduced into the second fluid chamber upon rotation of the input shaft in the other direction while the hydraulic fluid in the first fluid chamber is discharged to the reservoir. The engaging portion of the valve lever has a concave or slot portion which is provided with the engaging surface at its inner circumference portion and is received in an outer diameter of the power piston. A pin member has an end portion slidably engaged with the concave portion and the other end portion secured to the valve spool and connecting the valve lever with the valve spool.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF A PREFERRED EMBODIMENT

Figure 1:
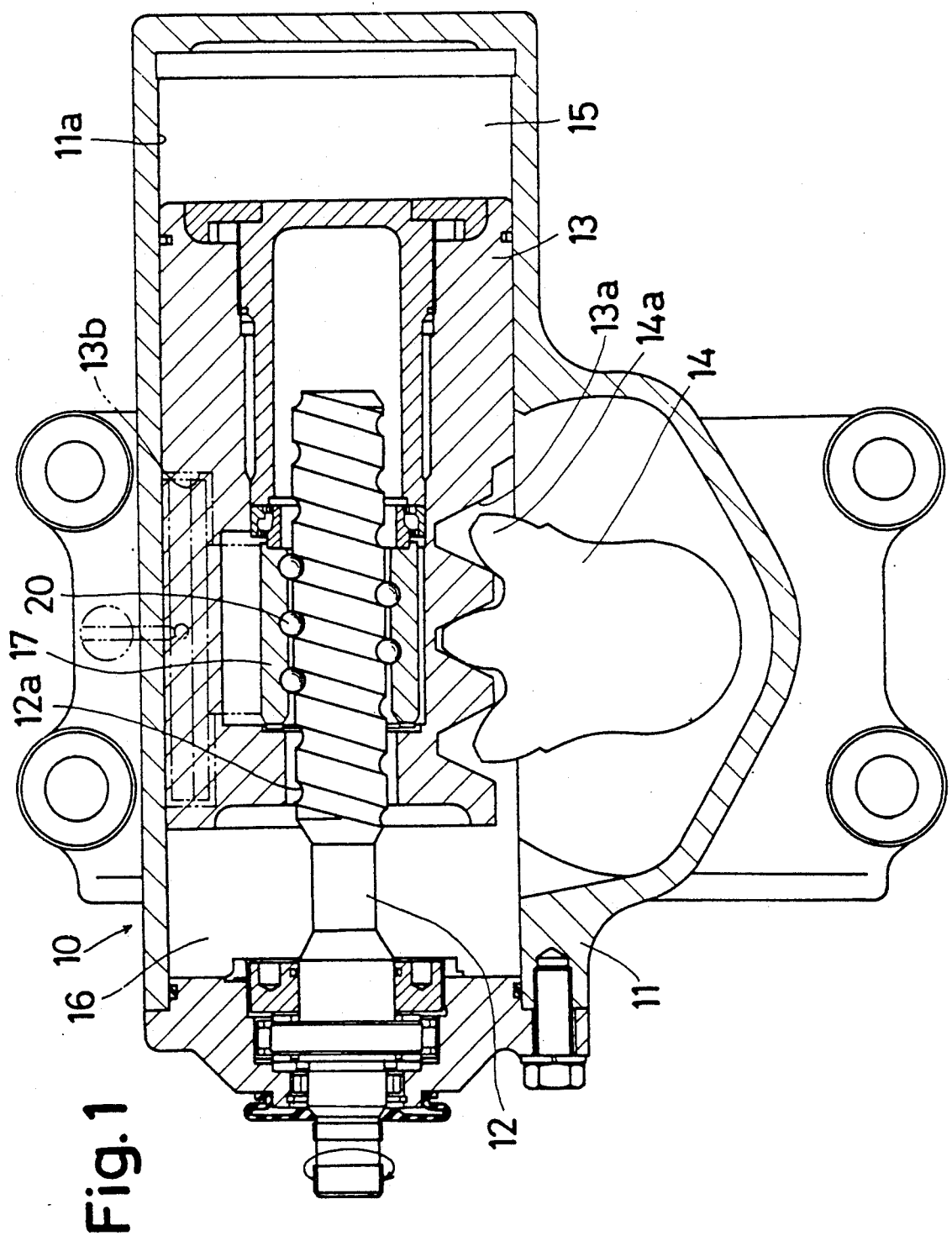
FIG. 1 is a longitudinal sectional view of an embodiment of a hydraulically operated power steering system according to the present invention.
Figure 2:
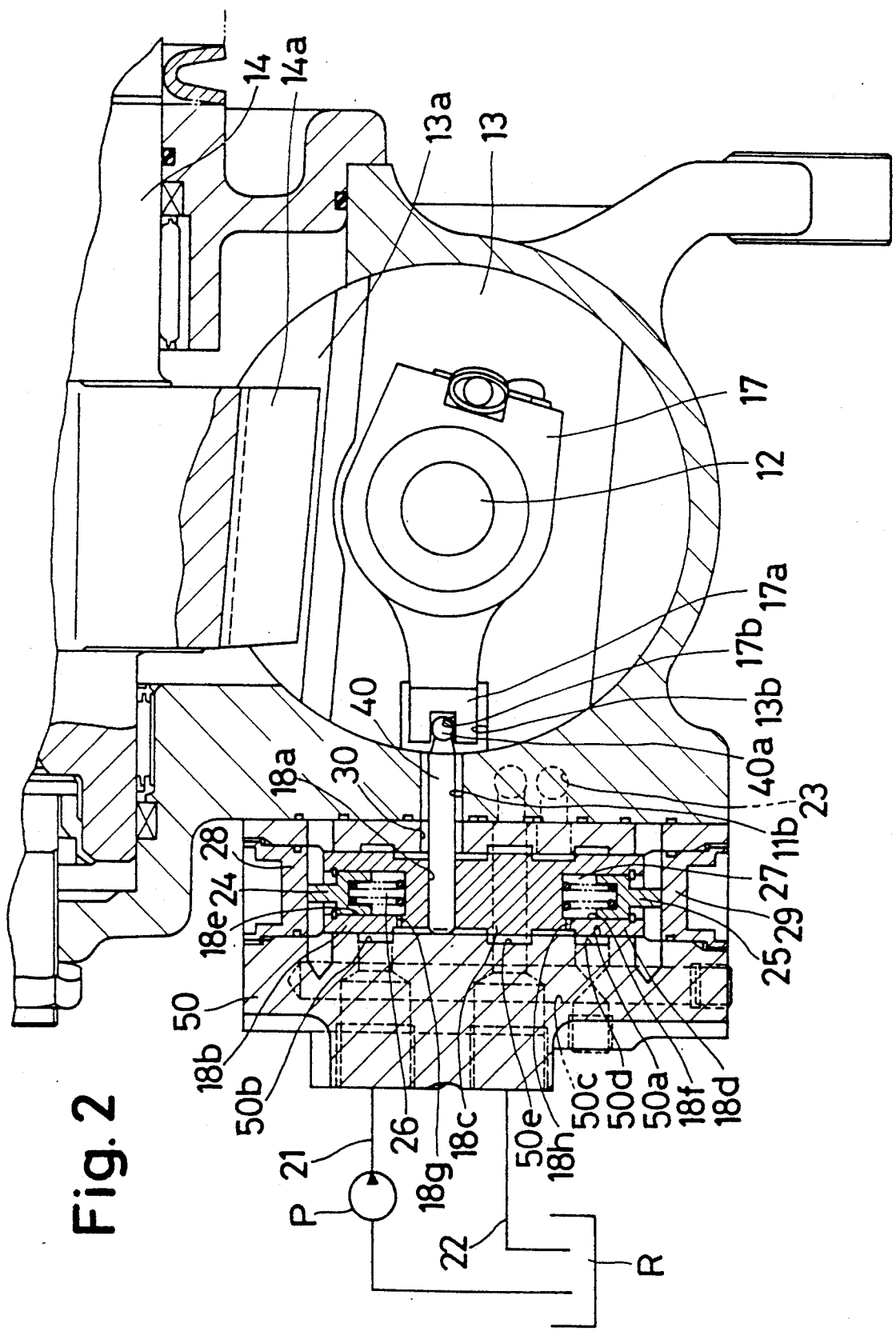
FIG. 2 is an enlarged transverse sectional view of an embodiment of a hydraulically operated power steering system according to the present invention.

Referring to FIGS. 1 and 2, a hydraulically operated power steering system 10 includes a housing 11 to be secured to a vehicle body (not shown), an input shaft 12 rotatably mounted within the housing 11, a power piston 13 slidably and fluid tightly disposed in an inner bore 11a of the housing 11, and an output shaft 14 having a sector portion 14a which is in meshing engagement with a rack portion 13a of the power piston 13. The input shaft 12 is operatively connected to a steering wheel (not shown) and the output shaft is operatively connected to a steering link mechanism (not shown). The housing 11 and the power piston 13 constitutes a reciprocal hydraulic operating cylinder device having a first fluid chamber 15 and a second fluid chamber 16 both of which are defined at opposite ends of the power piston 13 within the housing 11.

The power piston 13 is formed into a cylindrical configuration. Within the power piston 13, a valve lever 17 is in engagement with a spiral groove 12a of the input shaft 12 through a recirculating ball 20 so as to be rotatable through an angle but not axially movable with respect to the power piston 13. Thus, upon rotation of the input shaft 12, the valve lever 17 and the input shaft 12 rotate as a unit through an angle. An engaging portion 17a is formed at a distal end of the valve lever 17 and is loosely disposed in an axially extending slot 13b formed in the power piston 13. The engaging portion 17a also extends along the slot 13b in the axial direction of the power piston 13 and a concave or slot portion 17b is formed at the engaging portion 17a for slidably receiving therein a spherical end 40a of a pin 40 which will be detailed later.

In FIG. 2, a body 50 having therein an inner bore 50a which is in the form of an independent member from the housing 11 is secured thereto in such manner from the inner bore 11a. In the bore 50a of the body 50, there is slidably mounted a spool 18 having therein a radial hole 18a. The other end of the pin 40 having at one end thereof a spherical end 40a fitted in the concave portion 17b which extends through a hole 11b of the housing 11 and into the hole 18a of the spool 18. Thus, the valve spool 18 is provided with reciprocal movement via the valve lever 17 upon rotation of the input shaft 12.

In order to prevent excess pressure from being applied to the pin 40, connection of the engaging portion 17a with the slot 13b is completed before engagement of the pin 40 with the hole 11b. In the bore 50a, an annular groove 50b is formed which is in fluid communication with a fluid pump P via a passage 21. An annular groove 50d is in fluid communication with the annular 50b via an annular passage 50c and an annular groove 50e is in fluid communication with a reservoir R via a passage 22. On an outer surface of the valve spool 18, there is a land 18b, a land 18c and a land 18d which are either opposed to or in alignment with the annular groove 50b, the annular groove 50d and the annular groove 50e, respectively, while the steering wheel is in the neutral position. A pair of bores 18e and 18f, each of which is open in the outward direction, are formed at opposite ends of the valve spool 18. Also, within the bore 50a, the passage which is in fluid communication with the first fluid chamber 15 is opened between the lands 18c and 18d, and a passage 30 which is in fluid communication with the second fluid chamber 16 via the hole 11b is opened between the lands 18b and 18c.

In the bore 18e and 18f, there is slidably mounted a reaction piston 24 and 25, respectively, so that a pair of reaction pressure chambers 26 and 27 are defined. The reaction pistons 24 and 25 are urged in the outward direction by a spring and into abutment with plugs 28 and 29 secured in the openings of the bore 50a. A precise relationship between the foregoing lands and the annular grooves can be established by adjusting the position of each plug 28, 29 before mounting of the body 50 to the housing 11.

Hereinafter, operation of the foregoing embodiment of the present invention will be described. In FIG. 1, upon rotation of the input shaft 12 in the clockwise direction as shown by the arrow, unitary rotation of the valve lever 17 and input shaft 12 relative to the power piston 13 causes downward movement of the valve spool 18 in the bore 50a due to the connection to the valve lever 17 via the pin 40 as seen in FIG. 2. Thus, fluid from the pump P is provided to the second chamber 16 via the passage 21, the annular groove 50b, the passage 30 and the hole 11b, and is supplied into the reaction chamber 26 via an orifice 18g formed in the valve spool 18. Also, fluid in the first fluid chamber 15 is drained into or returned to the reservoir R via the passage 23, the annular groove 50e and the passage 22. The reaction chamber 27 is also brought into fluid communication with the reservoir R via an orifice 18h formed in the valve spool 18.

Accordingly, a pressure-difference between the chambers 15 and 16 is generated and resulting pressure assists the advance of the power piston 13. Thus, the output shaft 14 which is in a meshing engagement with the power piston 13 is rotated, thereby operating the steering link mechanism. Due to the above-mentioned assistance to the power piston 13, the force to be applied to the steering wheel can be reduced. The unitary movement of the valve lever 17 and the power piston 13 causes the relative movement between the concave or slot portion 17b of the valve lever 17 and the spherical end 40a of the pin 40. Simultaneously, pressure is applied from both chambers 26 and 27 across the valve spool 18 and the differential pressure thereacross by which the movement of the valve lever 17 is prevented is transmitted to the driver as a reaction force. In this embodiment, two springs urge the reaction pistons apart, thereby generating two-stage characteristic in the reaction force.

In this embodiment, the concave or slot portion 17b is formed within the distal end of the engaging portion 17a of the valve lever 17. The engaging portion 17a is accommodated within the slot 13b which is formed in the outer portion of the power piston 13. In addition, the valve spool 18 receives in hole 18a the other end of the pin 40 having one end slidably fitted in the concave or slot portion 17b of the valve lever 17. The valve spool is slidable within the bore 50a of the body 50 which is spaced from the inner bore 11a of the housing 11 in which the power piston 13 is slidably mounted so that the valve spool 18 is moved by the power piston 13 via pin 40.

Thus, in this embodiment, the separation of the bore 50a, of the body 50, from the inner bore 11a of the housing 11 in which the power piston 13 is accommodated provides sufficient sliding surface of the power piston 13 without increasing the axial length. Further, by positively providing movement of the pin 40, the power piston 13 can be formed in a cylindrical configuration. Consequently, the diameter of the surface of the rack portion 13a, formed on the outer surface of the power piston 13, can be enlarged, i.e., the depth of the rack 13a can be increased, thereby providing sufficient strength of the rack portion 13a.

Therefore, upon increasing the assist quantity of the hydraulically operated power steering system, the axial length of the power piston 13 can be decreased by positioning the rack portion 13a and the valve lever 17 on the same side in the axial direction and still permit the size of the system to be decreased while still providing for ease of assembly and installation of the device.

Operation of the steering device when the input shaft 12 is rotated in the opposite direction is omitted as it is the reverse of the foregoing description.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulically operated power steering system comprising:
   a housing;
   an input shaft rotatably mounted in the housing;
   a reciprocal hydraulic operating cylinder means for moving a steering link mechanism and having first and second fluid chambers defined in an inner bore of the housing;
   a power piston slidably disposed in the inner bore;
   a reservoir containing hydraulic fluid;
   a fluid pump feeding hydraulic fluid in the reservoir to the cylinder means;
   a control valve device including a valve lever disposed in the power piston so as to be relatively rotatable with respect to the power piston and to move in an axial direction of the housing with the power piston in response to rotation of said input shaft, the valve lever having an engaging portion provided with an engaging surface extending in a direction of sliding movement of the power piston;
   a valve spool slidably disposed in a bore separate from and perpendicular with respect to the inner bore and slidably engaged with the engaging portion of the valve lever so as to reciprocatingly slide in response to rotation of the input shaft, wherein the hydraulic fluid from the fluid pump is introduced into the first fluid chamber upon the rotation of the input shaft in a first direction and the hydraulic fluid in the second fluid chamber is discharged to the reservoir, the hydraulic fluid from the fluid pump is introduced into the second fluid chamber upon rotation of the input shaft in a second direction when the hydraulic fluid in the first fluid chamber is discharged to the reservoir;
   the engaging portion of the valve lever having a slot portion provided with the engaging surface at an inner circumferential portion and connected at an opposite end to the power piston; and
   a pin member having a first end portion slidably engaged with the slot portion and a second end portion secured to the valve spool so as to connect the valve lever with the valve spool for movement therewith.

2. A hydraulically operated power steering system as recited in claim 1, wherein the power piston is of a right circular cylinder configuration and the inner bore is formed so as to correspond therewith.

3. A hydraulically operated power steering system as recited in claim 2 wherein the power piston is provided with a slot and the engaging portion extends in the axial direction the slot and is received therein.

4. A hydraulically operated power steering system as recited in claim 3, wherein the pin member protrudes through a hole formed in the housing and the engagement of the engaging portion with the slot is completed before the engagement of the pin with the hole.

* * * * *